United States Patent
Fiseni et al.

(10) Patent No.: US 11,280,763 B2
(45) Date of Patent: Mar. 22, 2022

(54) WEAR SOLE FOR ULTRASONIC INSPECTION AND METHOD OF MANUFACTURE

(71) Applicant: GE Sensing & Inspection Technologies, GmbH, Hürth (DE)

(72) Inventors: Alexander Fiseni, Hürth (DE); Christof Breidenbach, Hürth (DE); Frank Kahmann, Hürth (DE)

(73) Assignee: GE SENSING & INSPECTION TECHNOLOGIES GMBH, Hurth (DE)

(*) Notice: Subject to any disclaimer, the term of this patent is extended or adjusted under 35 U.S.C. 154(b) by 259 days.

(21) Appl. No.: 16/538,745

(22) Filed: Aug. 12, 2019

(65) Prior Publication Data
US 2020/0072796 A1 Mar. 5, 2020

Related U.S. Application Data

(60) Provisional application No. 62/725,756, filed on Aug. 31, 2018.

(51) Int. Cl.
*G01N 29/28* (2006.01)
*G01N 29/24* (2006.01)
*G01N 29/26* (2006.01)
*G01N 29/22* (2006.01)

(52) U.S. Cl.
CPC .......... *G01N 29/28* (2013.01); *G01N 29/221* (2013.01); *G01N 29/222* (2013.01); *G01N 29/2487* (2013.01); *G01N 29/26* (2013.01); *G01N 2291/2634* (2013.01)

(58) Field of Classification Search
CPC .... G01N 29/28; G01N 29/222; G01N 29/221; G01N 29/2487; G01N 29/26; G01N 29/043; G01N 2291/2634; G01N 2291/0231; G01N 2291/2696
See application file for complete search history.

(56) References Cited

U.S. PATENT DOCUMENTS 5,469,744 A * 11/1995 Patton ................. G01N 29/28
73/644
2011/0313293 A1* 12/2011 Lindekugel ............ A61B 8/44
600/461

(Continued)

*Primary Examiner* — Tarun Sinha
(74) *Attorney, Agent, or Firm* — Mintz Levin Cohn Ferris Glovsky and Popeo, PC; Lisa Adams

(57) ABSTRACT

A method for forming a wear sole includes forming a plurality of layers from a frame material, adjacent layers bonded to one another to define a frame. The frame can include a proximal surface configured to secure the frame to a probe holder, a distal surface configured to contact a portion of a target, a body extending between proximal and distal surfaces, an aperture extending through proximal and distal surfaces and the body, and a channel extending from the proximal surface to a chamber in fluid communication with the distal surface. The method can optionally include placing a membrane within the aperture. The membrane can be coupled to the body by a seal, inhibiting passage of a fluid through the proximal surface via the aperture. The chamber can extend within the body between a distal surface of the membrane and the distal surface of the frame.

15 Claims, 13 Drawing Sheets

(56) References Cited

U.S. PATENT DOCUMENTS

| | | | |
|---|---|---|---|
| 2012/0267981 A1* | 10/2012 | Morris | A61B 8/4483 |
| | | | 310/314 |
| 2013/0074602 A1* | 3/2013 | Jackson | G01N 29/24 |
| | | | 73/633 |
| 2016/0185056 A1 | 6/2016 | Beacham et al. | |

* cited by examiner

900

```
┌─────────────────────────────────────────┐
│ Form a plurality of layers from at least one frame │
│ material, where adjacent layers are bonded to one  │
│      another to define a frame of a wear sole      │
│                    902                             │
└─────────────────────────────────────────┘
                      │
                      ▼
┌─────────────────────────────────────────┐
│ Place a membrane within an aperture of the frame,  │
│                    904                             │
└─────────────────────────────────────────┘
```

FIG. 9

WEAR SOLE FOR ULTRASONIC INSPECTION AND METHOD OF MANUFACTURE

CROSS-REFERENCE TO RELATED APPLICATIONS

This application claims the benefit of U.S. Provisional Patent Application No. 62/725,756, filed Aug. 31, 2018 and entitled "Wear Sole For Ultrasonic Inspection and Method Of Manufacture," the entirely of which is incorporated by reference.

BACKGROUND

Ultrasonic inspection can be used to non-destructively detect defects (e.g., cracks, inclusions, voids, etc.) in manufactured articles such as pipes, bars, beams, billets, or other parts that require non-destructive inspection. As an example, an ultrasonic transducer can be used to transmit ultrasonic waves (sound waves) into the inspected part and these transmitted ultrasonic waves can reflect from boundaries within the inspected part (e.g., defects and outer boundaries) back to the ultrasonic transducer. The properties of the reflected ultrasonic waves can be measured by the ultrasonic transducer and subsequently analyzed to identify characteristics of defects detected within the inspected part, including location and size.

During inspection, ultrasonic transducers can be distanced from the inspected part to avoid wear and dirt accumulation. Because ultrasonic waves are not effectively transmitted through air at the ultrasonic frequencies used in non-destructive testing, an ultrasonic couplant (e.g., a liquid or gel) is typically provided within a space between the transducer and the inspected part to facilitate transmission. When the ultrasonic transducer is moved to a new location, the ultrasonic couplant drains from this space and is refilled before inspection is continued. While the delay incurred due to an individual filling is relatively modest (e.g., about 5 sec), it can add up to hours in a high-throughput inspected part manufacturing environment, where hundreds to thousands of pipes are tested daily.

SUMMARY

In general, systems and methods are provided for ultrasonic testing of materials and manufacturing wear components for a non-destructive ultrasonic inspection system.

In one embodiment, a probe holder configured to receive an ultrasonic probe is provided and can include a body, a wear sole, and a fluid channel. The body can define a first chamber configured to receive a first volume of ultrasonic couplant. In certain embodiments, the first chamber can also be configured to receive a distal end of an ultrasonic probe. The wear sole can define a second chamber configured to receive a second volume of ultrasonic couplant and it can be removably coupled to a distal end of the body. The wear sole can also have a membrane extending thereacross for separating the first chamber from the second chamber. The fluid channel can extend through the body and the wear sole and it can be configured to deliver the second volume of ultrasonic couplant to the second chamber.

The wear sole can have a variety of configurations. In one embodiment, the wear sole can include an aperture extending between a proximal facing surface and a distal facing surface and the membrane can be positioned within the aperture. In certain aspects, the membrane can be configured to propagate ultrasonic waves therethrough.

The second chamber can have a variety of configurations. In one embodiment, at least a portion of the second chamber can be aligned with the first chamber. In certain aspects, a volume of the second chamber can be less than a volume of the first chamber.

In another embodiment, a distal side of the wear sole can be configured to mate with a pipe.

In another embodiment, the wear sole can include a lateral tab and the body can include a slot formed laterally adjacent to the distal end. The slot can be configured to receive the lateral tab.

In another embodiment, a wear sole for ultrasonic inspection is provided and can include a frame configured to removably mate to a probe holder body. The frame can have an aperture extending therethrough between a proximal facing surface and a distal facing surface. A membrane can extend across the aperture and it can be configured to propagate ultrasonic waves therethrough. The frame can also have a fluid delivery channel formed therein for delivering an ultrasonic couplant to a portion of the aperture distal to the membrane.

The frame can have a variety of configurations. In one embodiment, the frame can include a lateral tab configured to engage a corresponding slot in the probe holder body. In certain aspects, a distal facing surface of the frame can be configured to mate with a pipe. In another aspect, the frame can be configured to direct the flow of ultrasonic couplant along at least a portion of the length of the membrane.

In another embodiment, the membrane can be proximally offset from the distal facing surface of the frame.

In another embodiment, the fluid delivery channel can be configured to direct a flow of ultrasonic couplant from a first side of the frame to a second side of the frame opposite to the first side of the frame.

In another embodiment, a method of ultrasonic inspection is provided and can include removably coupling a wear sole to a distal end of a probe holder, positioning the probe holder in contact with a pipe via the wear sole, filling a first chamber in the probe holder with a first volume of ultrasonic couplant, and filling a second chamber extending between the wear sole and the pipe with a second volume of ultrasonic couplant. The first and second chambers can be separated by a membrane, and the second volume of ultrasonic couplant can be in fluid contact with the pipe. The method can further include propagating ultrasonic waves from an ultrasonic transducer in the probe holder, through the first volume of ultrasonic couplant, through the membrane, and through the second volume of ultrasonic couplant to the pipe.

In another embodiment, the membrane can extend across an aperture in a frame of the wear sole, and the method can further include removing and replacing the wear sole with a new wear sole having a membrane extending thereacross for separating the first and second chambers.

In another embodiment, the first volume of ultrasonic couplant in the first chamber can be greater than the second volume of ultrasonic couplant in the second chamber.

In other aspects, the first volume of ultrasonic couplant in the first chamber can remain substantially constant and the second volume of ultrasonic couplant can be continuously delivered to the second chamber to fill the second chamber.

In another embodiment, the second volume of ultrasonic couplant can be delivered to the second chamber via a fluid channel extending through the probe holder and wear sole.

In another embodiment, the membrane can be configured to propagate ultrasonic waves emitted by the ultrasonic probe.

As discussed herein, ultrasonic inspection systems can include an ultrasonic transducer, a wear sole, a probe holder, and a coupling media. The wear sole can be configured to be easily detachable and exchangeable from the probe holder, allowing the wear sole to be replaced during inspection when a degree of wear exceeds a threshold amount. Embodiments of the present disclosure provide for manufacturing of wear soles in a layer-by-layer fashion using additive manufacturing techniques, also referred to as 3D printing. Wear soles manufactured in this manner can exhibit one or more specific, tailored properties, such as wear resistance, acoustic properties, fluidic properties, reduced weight, and/or increased stiffness, avoidance of bubbles in couplant, flush away of existing bubbles in couplant, and fast coupling times.

In certain embodiments the layers of the wear sole can be configured to provide gradients in its acoustic properties. Acoustic properties can include, but are not limited to, one or more of velocity, attenuation, and impedance. As discussed in detail below, by manufacturing the wear sole with different regions having different acoustic properties, ultrasonic energy traveling through the wear sole can be controlled in order to avoid undesired reflections. The different regions can include one or more of cavities, wedges, and different densities.

In an embodiment, a method for forming a wear sole of an ultrasonic testing device is provided. The method can include forming a plurality of layers from at least one frame material, where adjacent ones of the plurality of layers can be bonded to one another to define a frame of a wear sole. The frame can include a proximal surface, a distal surface, a frame body, an aperture, and a channel. The proximal surface can be configured to secure the frame to a distal end of a probe holder. The distal surface can be configured to contact a portion of a target surface. The frame body can extend between the proximal and distal surfaces. The aperture can extend through the proximal surface, the frame body, and the distal surface. The channel can extend from the proximal surface to a chamber in fluid communication with the distal surface.

In another embodiment, the method can include placing a membrane within the aperture, adjacent to the proximal surface. The membrane can be coupled to the frame body by a substantially fluid-tight seal so as to inhibit passage of a fluid through the proximal surface via the aperture.

In another embodiment, chamber can extend within the frame body between a distal surface of the membrane and the distal surface of the frame.

In another embodiment, the plurality of layers can define a first region including a first frame material exhibiting a first acoustic property and a second region including a second frame material exhibiting a second acoustic property. The first and second regions can occupy different locations within the frame. The first and second frame materials can be different materials.

In another embodiment, the plurality of layers can define at least one cavity within the frame body In another embodiment, the plurality of layers can define at least one first cavity configured to receive a reinforcement material having a strength greater than a strength of the frame material.

In another embodiment, the plurality of layers can define at least one first cavity configured to receive a reinforcement material having a stiffness greater than a stiffness of the frame material.

In another embodiment, the plurality of layers can define at least one first cavity configured to receive a hardened material having a hardness greater than a hardness of the frame material.

In another embodiment, the plurality of layers can define at least one second cavity configured to reduce a weight of the frame as compared to a comparable frame formed without the at least one second cavity.

In another embodiment, the plurality of layers can define one or more attachment features formed on or adjacent to the proximal surface and configured to secure the frame to the distal end of a probe holder.

In another embodiment, the distal surface is curved and dimensioned to abut a portion of an outer surface of a target.

In another embodiment, the method includes placement of a wear resistant layer on at least a portion of the distal surface.

In another embodiment, the channel is configured to cause a fluid received from a probe holder to flow laminarly from the proximal surface to the distal surface.

In another embodiment, the target is one of a pipe, a bar, a billet, or a rail wheel.

In another embodiment, the target is formed from a composite material.

DESCRIPTION OF DRAWINGS

These and other features will be more readily understood from the following detailed description taken in conjunction with the accompanying drawings, in which:

FIG. 9 is a flow diagram illustrating one exemplary embodiment of a method of manufacturing a wear sole;

DETAILED DESCRIPTION

Methods, systems, and devices are provided for manufacture of wear components of ultrasonic inspection systems. Current ultrasonic inspection apparatuses typically deliver ultrasonic waves through an ultrasonic couplant and into a target (e.g., a pipe), and measure ultrasonic waves reflected from the target. Each time the inspection apparatus is moved to a new location, the ultrasonic couplant must be replenished, resulting in a delay. Accordingly, a removable wear sole is provided that retains a fixed amount of ultrasonic couplant within an ultrasonic inspection apparatus, requiring only a small volume of ultrasonic couplant to be replenished when the apparatus is moved. The wear sole can also be easily replaced when sufficiently worn. Embodiments of the wear sole can be manufactured by additive manufacturing, also referred to as three-dimensional (3D) printing. In 3D printing, one or more materials are deposited layer by layer to form a frame of the wear sole. This allows precise control over the composition and geometric features of the wear sole, which can in turn improve the properties of the wear sole. In one aspect, the wear sole can be formed from one or more materials that demonstrate specific properties, such as increased wear resistance, acoustic properties, fluidic properties, reduced weight, increased stiffness, and increased strength, amongst others. In this manner, additively manufactured wear soles can be formed at reduced cost, while exhibiting improved acoustic properties and/or longer lifetime. Other embodiments are within the scope of the disclosed subject matter.

Embodiments of the disclosure are discussed herein with respect to ultrasonic detection of defects within targets having the form of pipes. However, a person skilled in the art will appreciate that the disclosed embodiments can be employed to ultrasonically detect defects in other structures and/or geometries without limit. Examples can include bars, billets, rail wheels, and other structures formed from composite materials.

Figure 1:
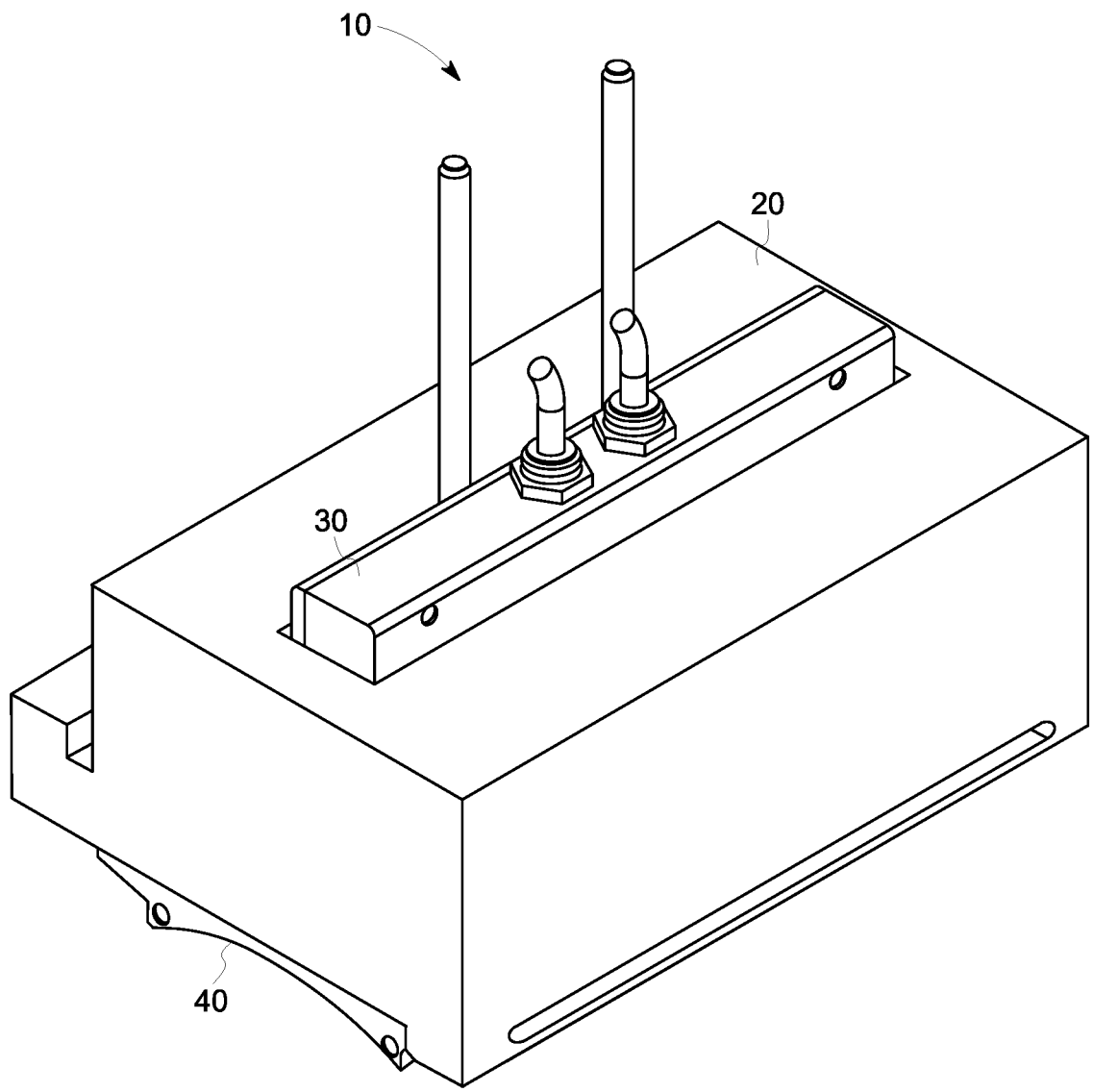
FIG. 1 is a perspective view of one exemplary embodiment of an ultrasonic inspection apparatus including an ultrasonic probe and a probe holder with a removable wear sole.
Figure 2:
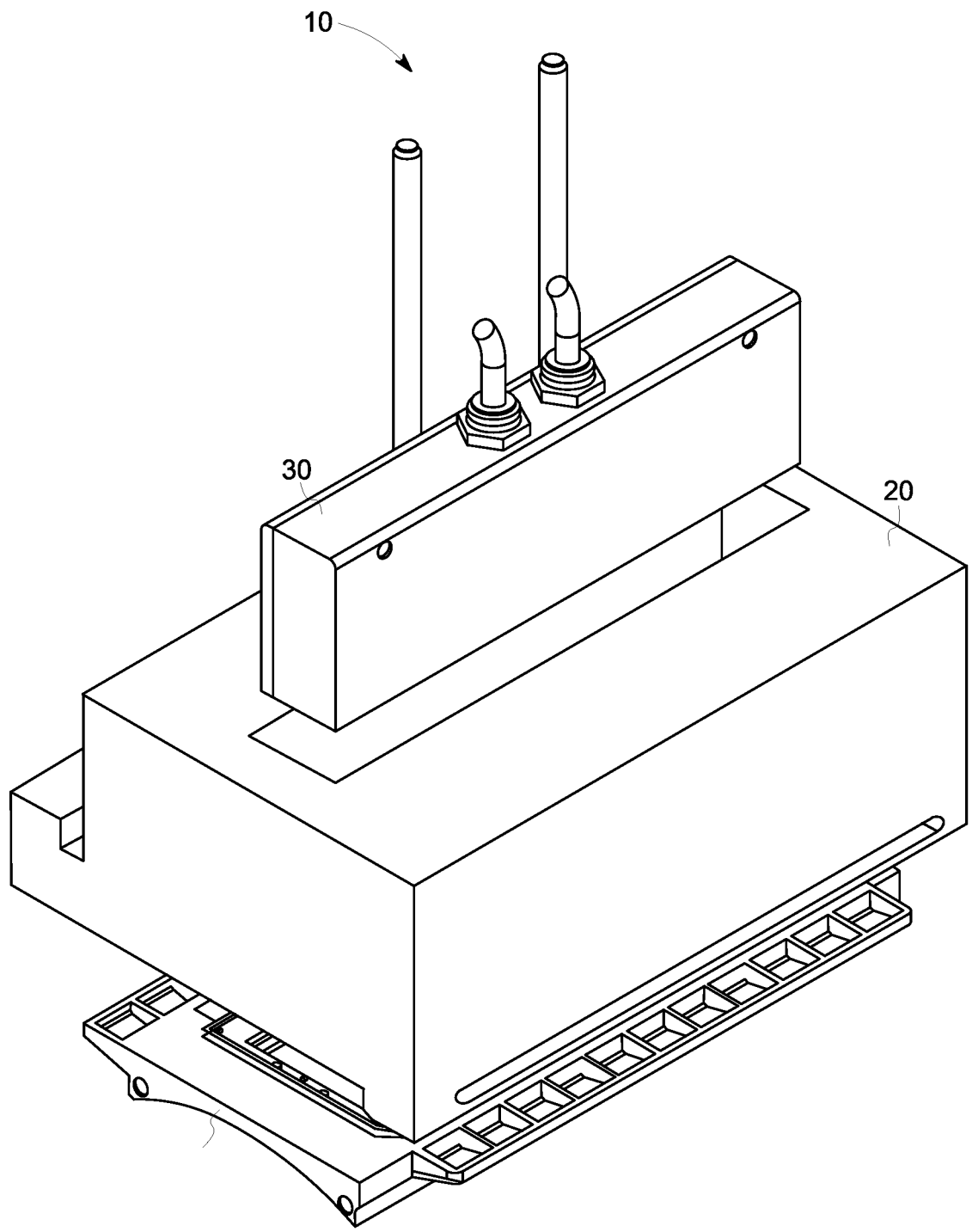
FIG. 2. is a perspective view of the ultrasonic inspection apparatus of FIG. 1 illustrating the ultrasonic probe and wear sole detached from the probe holder.

FIGS. 1-2 illustrate one exemplary embodiment of an ultrasonic inspection apparatus 10. As shown, the ultrasonic inspection apparatus 10 can include a probe holder 20 having an ultrasonic probe 30 and a wear sole 40 mounted thereto. The probe holder 20 can be configured to engage a pipe (not shown) via the wear sole 40 and retain a volume of ultrasonic couplant(s) between the ultrasonic probe 30 and the pipe during inspection. Between inspections, the wear sole 40 can be easily detached from the probe holder for replacement due to wear and accumulation of contaminants (e.g., dirt). As discussed in detail below, the probe holder 20 and wear sole 40 can be configured such that, when the ultrasonic inspection apparatus 10 is moved from one inspected pipe to another, a majority portion of the ultrasonic couplant(s) is retained, while a minority portion is drained. Thus, the time needed to replace the drained ultrasonic couplant(s) is reduced, as compared to replacing all of the ultrasonic couplant(s). Embodiments of the pipe can include any substantially tubular structure formed by any process and material (e.g., steels, copper and copper alloys, aluminum and aluminum alloys, etc.).

Figure 3:
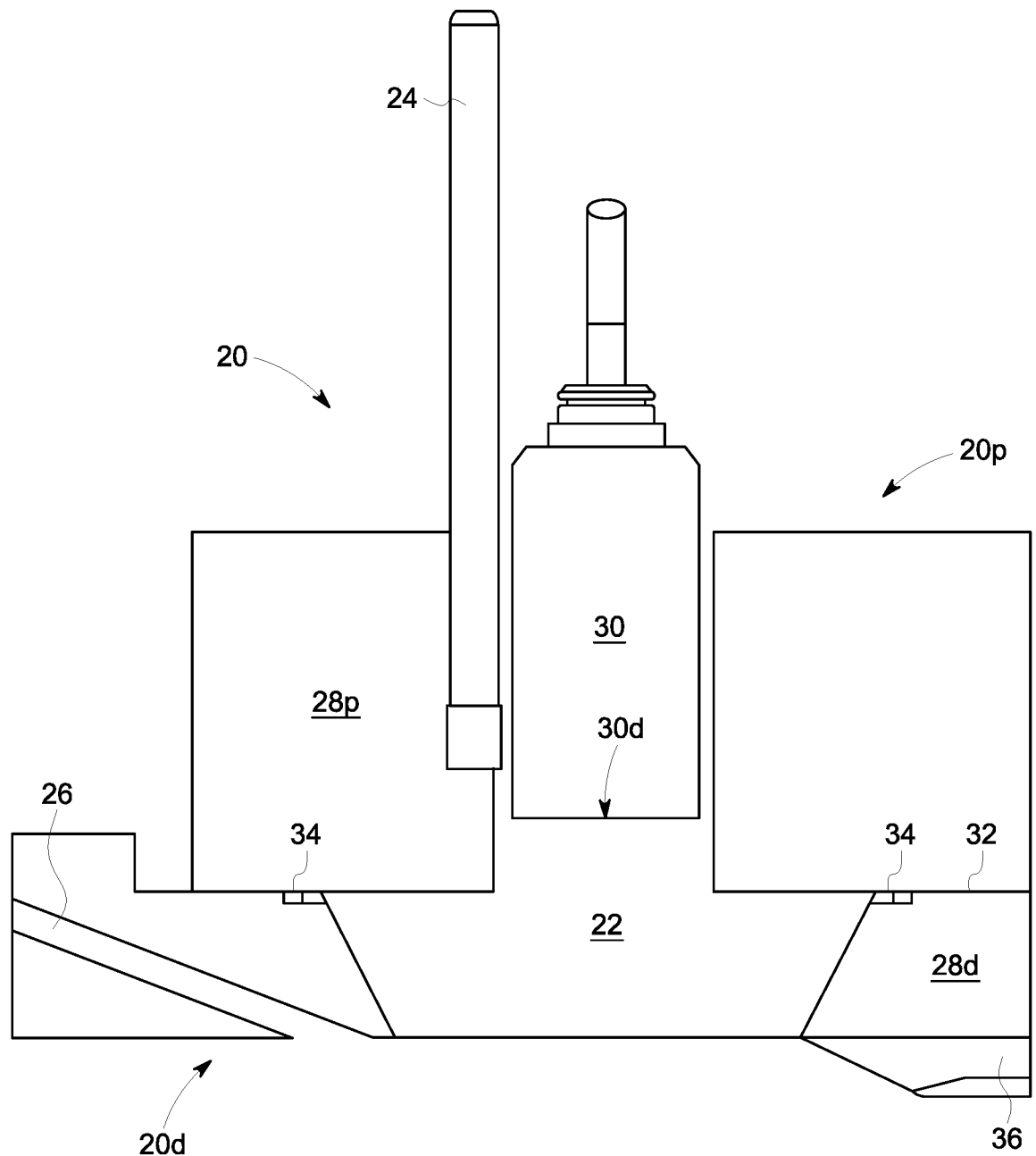
FIG. 3 is a cross-sectional view of the probe holder and probe of FIG. 1.

FIG. 3 is a cross-sectional view illustrating the probe holder 20 and the ultrasonic probe 30 of FIGS. 1-2. As shown, the probe holder 20 can be in the form of a generally rectangular housing or body having a first chamber 22 extending between a proximal end 20p and a distal end 20d. The first chamber 22 can be configured to receive the ultrasonic probe 30 and a first volume of ultrasonic couplant. As shown, a distal end 30d of the ultrasonic probe 30 can be inserted through an opening in the proximal end 20p of the probe holder 20 and secured therein. The distal end 30d of the ultrasonic probe 30 can be positioned within the first chamber 22 at a selected distance from the distal end 20d of the probe holder 20.

The first volume of ultrasonic couplant can be delivered to the first chamber 22 via a first couplant supply 24 (e.g., hoses, pipes, etc.) in fluid communication with the first chamber 22 and a first couplant source (not shown). The first couplant supply 24 can fill the first chamber 22 with the first volume of the first ultrasonic couplant. In FIG. 3, the first couplant supply 24 is illustrated as extending through the proximal end 20p of the probe holder 20. However, in alternative embodiments, the first couplant supply can extend through the probe holder in other directions for fluid communication with the first chamber.

The probe holder 20 can also define a first fluid channel 26 configured to receive a second volume of ultrasonic couplant. The first and second volumes of ultrasonic couplants can be the same ultrasonic couplant or different ultrasonic couplants. As shown, the first fluid channel 26 can extend from a lateral surface of the probe holder 20 to the distal end 20d of the probe holder 20. The first fluid channel 26 can also extend along at least a portion of a length of the probe holder 20. In certain embodiments, the first fluid channel 26 does not fluidly communicate with the first chamber 22. The first fluid channel 26 can be placed in fluid communication with a second ultrasonic couplant source (not shown) and can direct a flow of ultrasonic couplant through the probe holder 20 to the distal end 20d.

In certain embodiments, the probe holder 20 can be formed from multiple components. For example, the probe holder 20 can include a proximal portion 28p sealingly engaged to a distal portion 28d at a joint 32. The joint 32 can include an interface between opposed surfaces of the proximal and distal body portions and one or more seals 34 positioned about the circumference of the first chamber 22 at the interface. The seals 34 can inhibit leakage of the first volume of ultrasonic couplant when retained within the first chamber 22.

Figure 4:
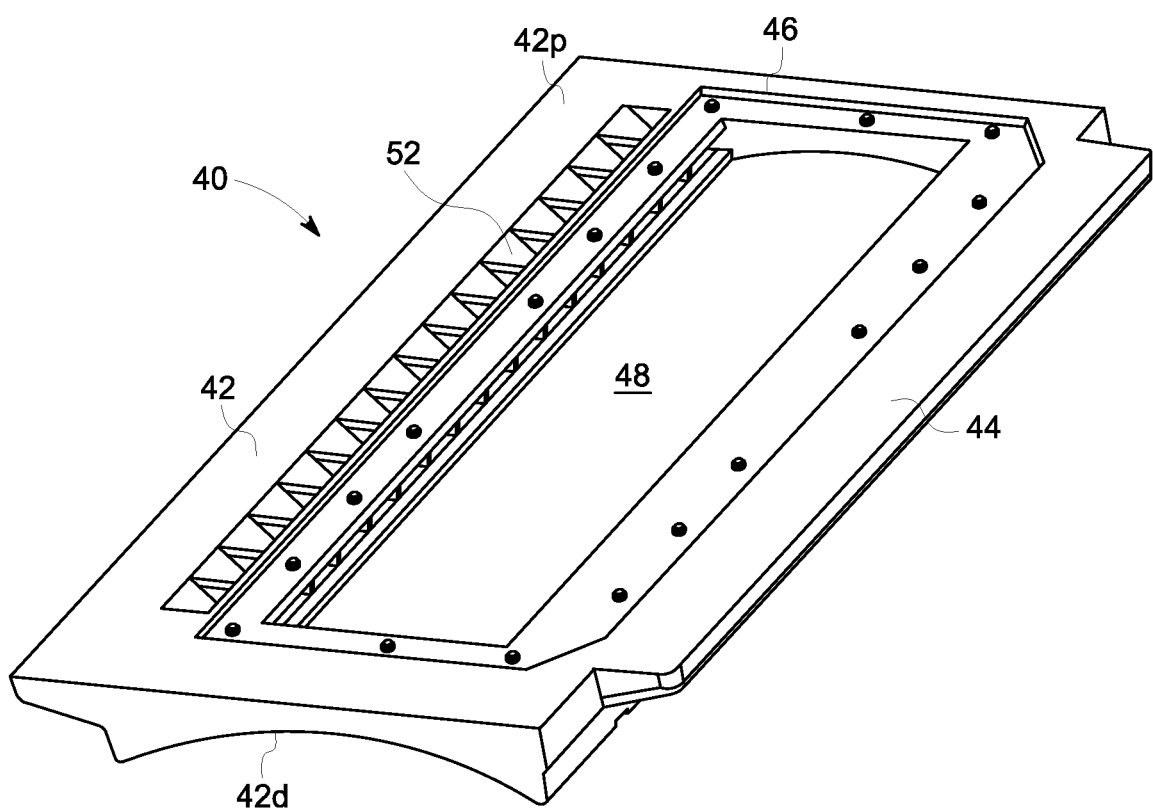
FIG. 4 is a perspective view of the wear sole of FIG. 1.
Figure 5:
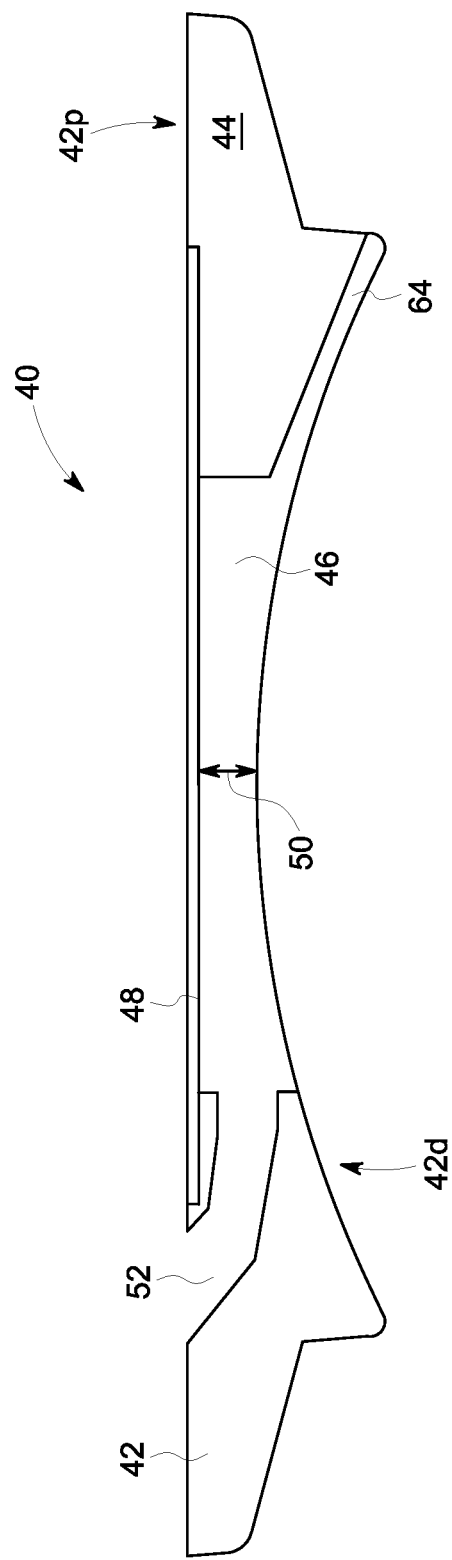
FIG. 5 is a cross-sectional view of the wear sole of FIG. 4.

FIGS. 4-5 illustrate the wear sole 40 in greater detail. In an exemplary embodiment, the wear sole 40 can include a frame 42 (e.g., a generally rectangular frame) having a proximal surface 42p, a distal surface 42d, and an aperture 46 extending therethrough. The proximal surface 42p of the frame 42 can be configured to mate to the distal end 20d of the probe holder 20. The frame 42 can also include a tab 44 extending laterally on and/or adjacent to the proximal surface 42p. The tab 44 can be dimensioned for receipt within a slot 36 formed in the distal end 20d of the probe holder 20. As an example, the tab 44 can be secured within the slot 36 by an interference fit, allowing the wear sole 40 to be quickly engaged or disengaged from the probe holder 20. In alternative embodiments, other mechanisms (e.g., mechanical fasteners, adhesives, etc.) can be employed in place of, or in combination with, the slot 36 and tab 44 for coupling the wear sole 40 to the probe holder 20.

The distal surface 42d of the frame 42 can be configured to engage a pipe. In certain embodiments, the distal surface 42d can have a radius of curvature that is the same, as or approximately equal to, that of a pipe to be inspected. In other embodiments the distal surface 42d can adopt any other shape (e.g., rectilinear, curved, arbitrary, etc.) suitable for mating with a surface of a pipe or other object to be inspected. For example, the wear sole can be a stiff system with respect to one fixed geometry of a test piece or a flexible system as is described in International Patent Publication No. WO 2013/127871, which is incorporated by reference herein in its entirety. While not shown, further embodiments of the frame 42 can include a plurality of recesses formed in the distal surface 42*d* that retain a wear resistant material therein (e.g., hardened steels, ceramics, etc.) to enhance the durability and service life of the wear sole 40.

The frame 42 can also include a membrane 48 positioned within the aperture 46. In certain embodiments, the membrane 48 can be proximally offset from the distal surface 42*d* of the frame 42 (e.g., flush mounted with respect to the proximal surface 42*p*) and can define a second chamber 50 distal to the membrane 48. As shown, the second chamber 50 can be bounded by side walls of the aperture 46 and bounded proximally by the membrane 48. That is, the second chamber 50 can be open to the distal surface 42*d* of the frame 42. The membrane 48 can also seal the second chamber 50 from the first chamber 22 when the wear sole 40 is coupled to the probe holder 20.

This configuration of the inspection apparatus 10 can significantly reduce the time required for ultrasonic inspection. As discussed in greater detail below, when the inspection apparatus 10 is moved from one inspection location to another, the first volume of ultrasonic couplant received within the first chamber 22 can be retained within the first chamber 22 rather than being drained from the first chamber 22. Thus, only ultrasonic couplant received within the second chamber 22 (e.g., a second volume of ultrasonic couplant) is drained and refilled between ultrasonic inspection runs performed at different test locations. As a result, a refilling time between ultrasonic inspection runs can be reduced.

In certain embodiments, the membrane 48 can be formed from a material having selected acoustic and/or mechanical properties. As an example, the membrane 48 can be formed from a material whose acoustic impedance is matched with ultrasonic couplant(s) in contact with the membrane 48 to minimize reflections and absorptions at interfaces between the membrane and ultrasonic couplant(s). In certain exemplary embodiments, the membrane material can be a material that is invisible or near invisible when used with a selected couplant, such that the material does not reflect ultrasound from the surface and does not absorb ultrasound when the waves pass therethrough, or at least minimizes reflection and absorption. In further embodiments, the membrane 48 can be formed from a mechanically rigid material. It can be desirable for the membrane 48 to be substantially rigid, undergoing less than a selected amount of deflection in response to forces exerted upon the membrane 48 due to ultrasonic couplant(s) in service (e.g., fluid flow pressure, force of gravity, etc.). Accordingly, the membrane 48 can possess an elastic modulus that limits the deflection of the membrane 48 to less than the selected amount.

By way of non-limiting example, suitable membrane materials include, but are not limited to, polymers, polymer blends, and rubber materials, such as polyethylene, polypropylene, polyvinylchloride, polystyrol, polytetrafluorethylene, polymethylmethacrylat, polyacrylnitril, polyacrylamide, aramides, polyetherketones, polyethylenglycol, polyurethane, silicons or poly(organo)siloxane, thermoplastic elastomers, melamine resin, polyacrylate rubber, ethylene-acrylate rubber, polyester urethane, bromo isobutylene isoprene, polybutadiene, chloro isobutylene isoprene, polychloroprene, chlorosulphonated polyethylene, epichlorohydrin, ethylene propylene, ethylene propylene diene monomer, polyether urethane, perfluorocarbon rubber, fluoronated hydrocarbon, fluoro silicone, fluorocarbon rubber, hydrogenated nitrile butadiene, polyisoprene, isobutylene isoprene butyl, acrylonitrile butadiene, butyl rubber, styrene butadiene, styrene ethylene butylene styrene copolymer, polysiloxane, vinyl methyl silicone, acrylonitrile butadiene carboxy monomer, styrene butadiene carboxy monomer, thermoplastic polyether-ester, styrene butadiene block copolymer, and styrene butadiene carboxy block copolymer. One exemplary membrane material is Aqualene™, manufactured by Innovation Polymers of Kitchener, Ontario, Canada.

The frame 42 can also be configured to receive an ultrasonic couplant and deliver the ultrasonic couplant to the second chamber 50. The second chamber 50 can be in fluid communication with a second fluid channel 52 extending through the frame 42 (e.g., from the proximal surface 42*p* of the frame 42 to the second chamber 50). The second fluid channel 52 can extend along at least a portion of the length of the aperture 46. When the second fluid channel 52 is placed in fluid communication with a source of the second ultrasonic couplant (not shown), the second volume of ultrasonic couplant can flow therethrough to fill the second chamber 50. As shown, the second fluid channel 52 includes one or more dividers 52*d* separating the second fluid channel into a plurality of fluid passageways 52*p*

Figure 6A:
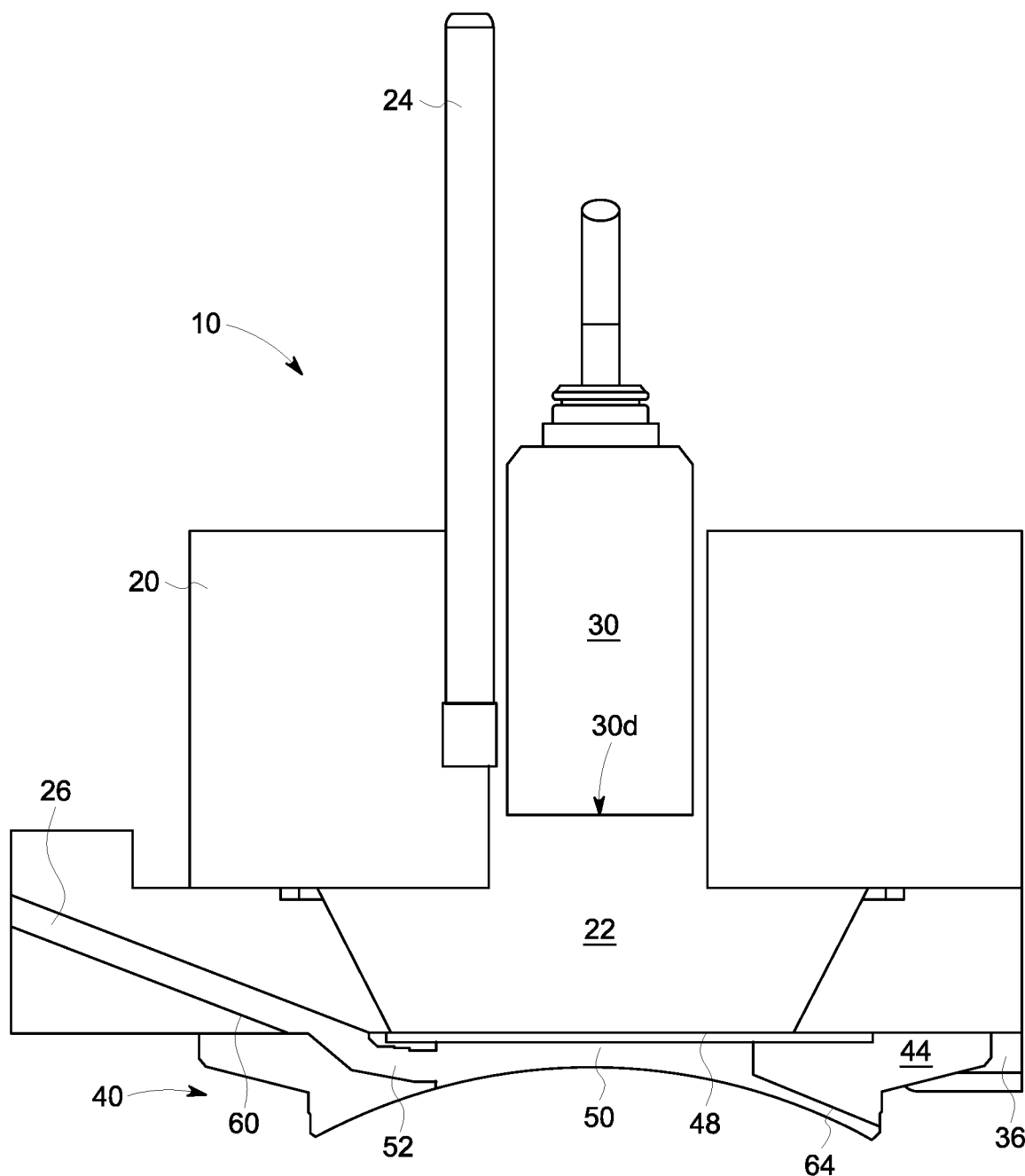
FIGS. 6A and 6B are cross-sectional views of the ultrasonic inspection apparatus of FIG. 1.

FIG. 6A illustrates a cross-sectional view of the ultrasonic inspection apparatus 10 with the wear sole 40 coupled to the probe holder 20. As shown, the tab 44 of the wear sole 40 can extend within the slot 36 of the probe holder 20 to removably couple the wear sole 40 to the probe holder 20. Coupled in this manner, various features of the probe holder 20 and the wear sole 40 can be aligned with respect to one another to facilitate use. When the ultrasonic probe 30 is mounted to probe holder 20 within the first chamber 22, the distal end 30*d* of the ultrasonic probe 30 can be positioned at a fixed distance and orientation with respect to the wear sole 40. This mounting can provide a line of sight from the distal end 30*d* of the ultrasonic probe 30 to the distal surface 42*d* of the frame 42, through the membrane 48, without obstruction from the probe holder 20 or the frame 42. In another aspect, ends of the first and second fluid channels 26, 52 can be aligned across opposed surfaces of the probe holder 20 and the wear sole 40 to form a continuous fluid delivery channel 60. The fluid delivery channel 60 can allow an ultrasonic couplant to flow within the probe holder 20 and the frame 42 of the wear sole 40 to fill the second chamber 50.

Figure 6B:
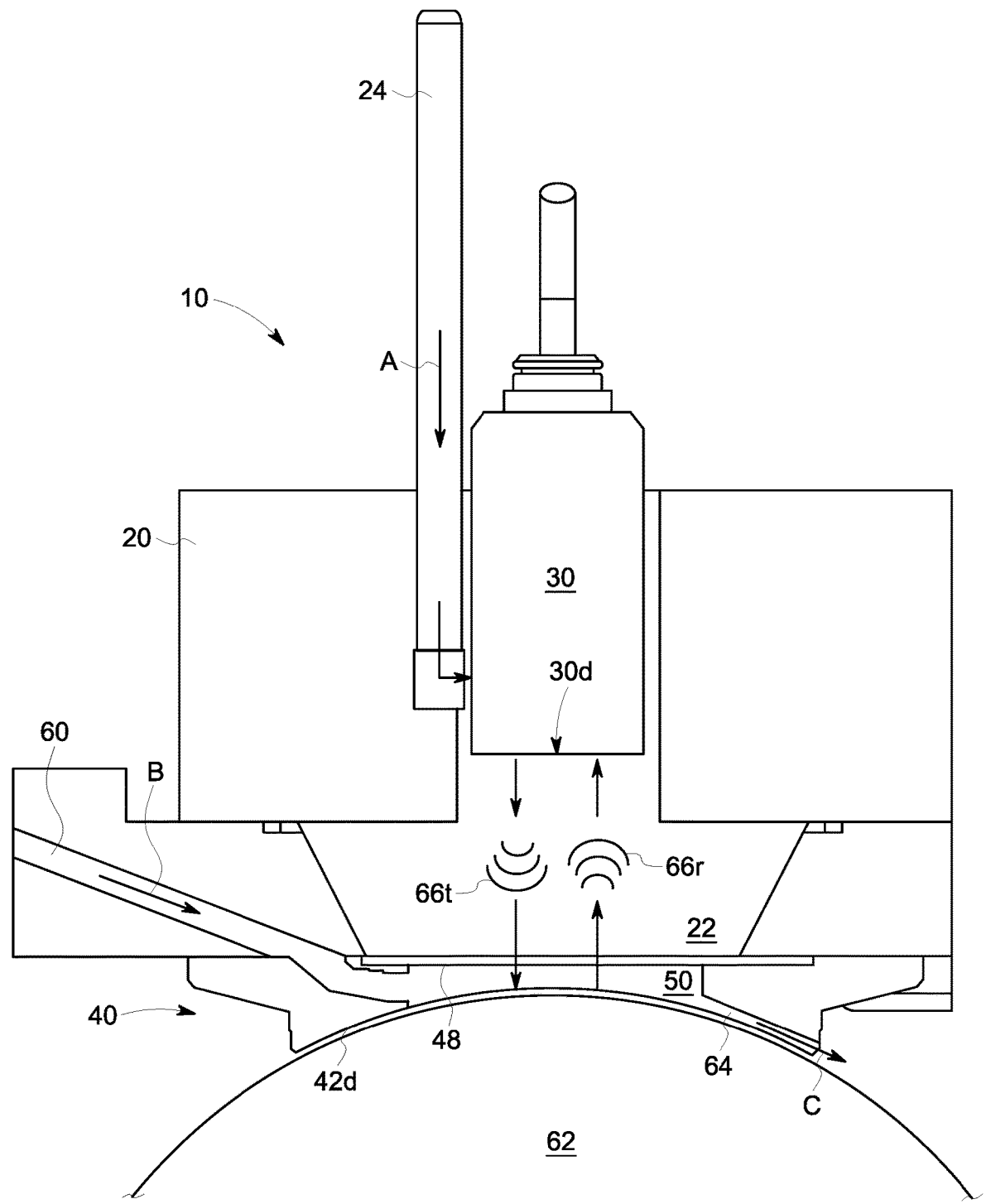

FIG. 6B illustrates a cross-sectional view of the ultrasonic inspection apparatus 10 positioned on a pipe 62 for performing an ultrasonic inspection. As shown, the distal surface 42*d* of the frame 42 of the wear sole 40 can be placed in contact with or adjacent to an outer surface of the pipe 62, distancing the distal end 30*d* of the ultrasonic probe 30 from an outer surface of the pipe 62. The first chamber 22 can be filled with the first volume of ultrasonic couplant via the first couplant supply 24 (arrow A) and the second chamber 50 can be filled with the second volume of ultrasonic couplant via the fluid delivery channel 60 (arrow B). When the distal end 20*d* of the probe holder 20 is sealingly engaged by the membrane 48, the first volume of ultrasonic couplant filling the first chamber 22 ($V_1$) can be substantially constant during inspection and movement of the ultrasonic inspection apparatus 10. In contrast to the first chamber 22, the second chamber 50 can be open to the distal surface 42*d* of the frame 42 and the pipe 62. When the distal surface 42*d* of the frame 42 is positioned on the pipe 62, the second chamber 50 becomes distally bounded and the second volume of ultrasonic couplant received within the second chamber 50 ($V_2$) can flow into contact with the outer surface of the pipe 62.

Under the influence of gravity and/or flow pressure, the second volume of ultrasonic couplant can also flow out of the second chamber 50 via a third fluid channel 64 (arrow C). The third fluid channel 64 can be formed in the distal surface 42*d* of the frame 42 and positioned laterally opposite the second fluid channel 52. In certain embodiments (not shown), the third fluid channel can be formed with two or more slots. As an example, each of the slots can have approximately the same width.

Thus, an ultrasonic couplant received within the second fluid channel 52 can flow laterally through one side of the frame 42 including the second fluid channel 52, through the second chamber 50, and through to the opposite side of the frame 42 including the third fluid channel 64. To maintain the volume of the second chamber 50 ($V_2$) filled with the second volume of ultrasonic couplant, a continuous flow of ultrasonic couplant can be delivered to the second chamber 50 via the fluid delivery channel 60. In this manner, an optimized flow path can be formed by the first channel 26, the second fluid channel 52, and the third fluid channel 64 in combination with the second chamber 50.

Alternatively or additionally, the cross-sectional area of the second fluid channel 52 can be larger than the cross-sectional area of the third fluid channel 64. This configuration can facilitate retention of the second volume of ultrasonic couplant within the second chamber 50, as fluid flow out of the second chamber 50 is restricted relative to fluid flow into the second chamber.

Once the first and second chambers 22, 50 are filled with the first and second volumes of ultrasonic couplants, respectively, the ultrasonic probe 30 can transmit ultrasonic waves towards the pipe for inspection. Ultrasonic waves 66*t* transmitted by the ultrasonic probe 30 can propagate through the first volume of ultrasonic couplant within the first chamber 22, through the membrane 48, and through the second volume of ultrasonic couplant within the second chamber 50 to the pipe 62. At the pipe 62, ultrasonic waves 66*r* can be reflected from surface and/or internal boundaries of the pipe 62 back towards the ultrasonic probe 30, propagating through the second volume of ultrasonic couplant within the second chamber 50, the membrane 48, and the first volume of ultrasonic couplant within the first chamber 22. At the ultrasonic probe 30, characteristics of the reflected ultrasonic waves 66*r* can be measured (e.g., amplitude, propagation time, etc.) and transmitted to a computing device for storage and/or analysis for detection of defects within the pipe 62.

After the ultrasonic probe 30 has completed acquiring measurements for one pipe, the ultrasonic inspection apparatus 10 can be removed from contact with the pipe 62 and/or repositioned relative to the pipe 62. The second volume ultrasonic couplant ($V_2$) can drain from the second chamber 50, through the open distal surface 42*d* of the frame 42 when the pipe 62 is removed, while the first of ultrasonic couplant ($V_1$) within the first chamber 22 can be retained. The first and second chambers 22, 50 can be configured such that the volume $V_1$ is greater than the volume $V_2$ so that the first volume of ultrasonic couplant occupies the majority of the path through which the ultrasonic waves 66*t*, 66*r* travel between the distal end 30*d* of the ultrasonic probe 30 and the pipe 62. As an example, the ratio of $V_1$ to $V_2$ can be in the range of about 2 to 1, 3 to 1, 4 to 1, 5 to 1, 10 to 1, 20 to 1, 30 to 1, 40 to 1, etc. In a non-limiting example, the ratio of $V_1$ to $V_2$ can be in the range of about 34 to 1. Thus, when the ultrasonic inspection apparatus 10 is disengaged from a pipe and engaged with another pipe, the second volume of ultrasonic couplant within the second chamber 50 ($V_2$) is drained and the first volume of ultrasonic couplant within the first chamber 22 ($V_1$) is retained, reducing the filling time needed to prepare the ultrasonic inspection apparatus 10 for inspection of the next pipe as compared to a circumstance in which the first and second volumes of ultrasonic couplants ($V_1+V_2$) of both the first and second chambers 22, 50 are drained.

Figure 7:
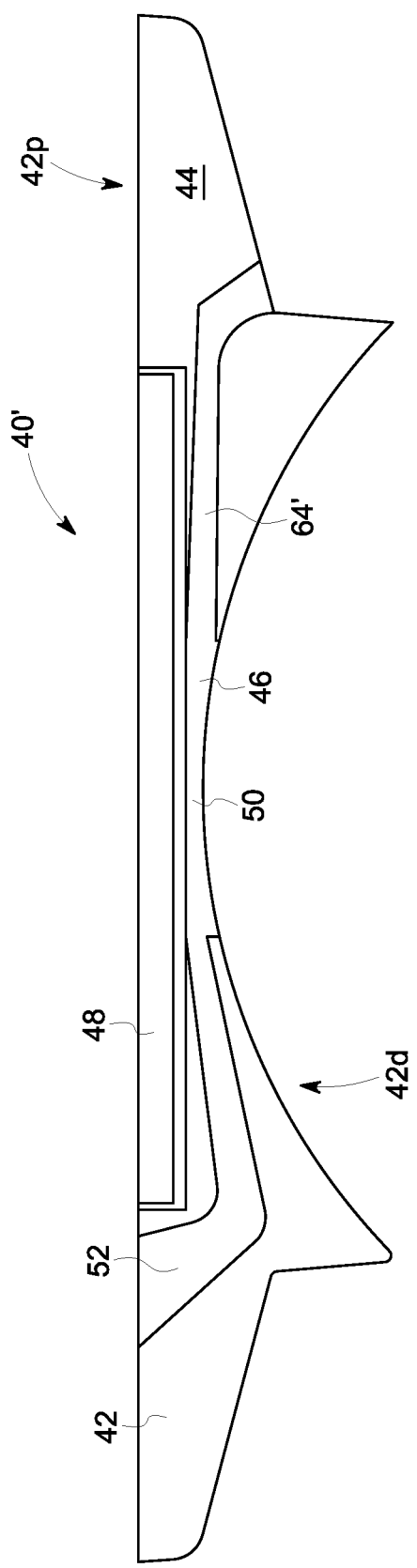
FIG. 7 is a cross-sectional view of another exemplary embodiment of a removable wear sole.

FIG. 7 is a cross-sectional view illustrating another exemplary embodiment of the removable wear sole 40 in the form of removable wear sole 40'. The wear sole 40' can be similar to wear sole 40, except that the third fluid channel 64 is replaced with third fluid channel 64'. Like the third fluid channel 64 of wear sole 40, the third fluid channel 64' of the wear sole 40' can be in fluid communication with the second chamber 50 and the distal surface 42*d* of the frame 42. Thus, the functionality and advantages discussed herein with respect to the third fluid channel 64 are also applicable to the third fluid channel 64'. However, in contrast to the third fluid channel 64, which can be formed in the distal surface 42*d* of the frame 42, the third fluid channel 64' can be formed within the bulk of the frame 42, where the terminal ends of the third fluid channel 64' can be in fluid communication with the second chamber 50 and the distal surface 42*d* of the frame 42.

Forming the third fluid channel 64' through the bulk of the frame 42 can be advantageous in operating environments where the wear sole is expected to undergo significant wear. Wear experienced by the wear sole can substantially remove some of the distal facing surface 42*d* of the frame 42. If the extent of this wear is extreme, it can potentially cause removal of a portion of the third fluid channel 64 and compromise the ability of the third fluid channel 64 to guide fluid exiting the second chamber 50. In contrast, forming the third fluid channel 64' through the bulk of the frame 42 can substantially avoid this issue.

In alternative embodiments of the inspection apparatus, the probe holder can be omitted. As an example, the ultrasonic probe can be attached directly to the membrane 48 by an adhesive or other fastening mechanism (e.g., straps, hook and loop fasteners, etc.)

Figure 8:
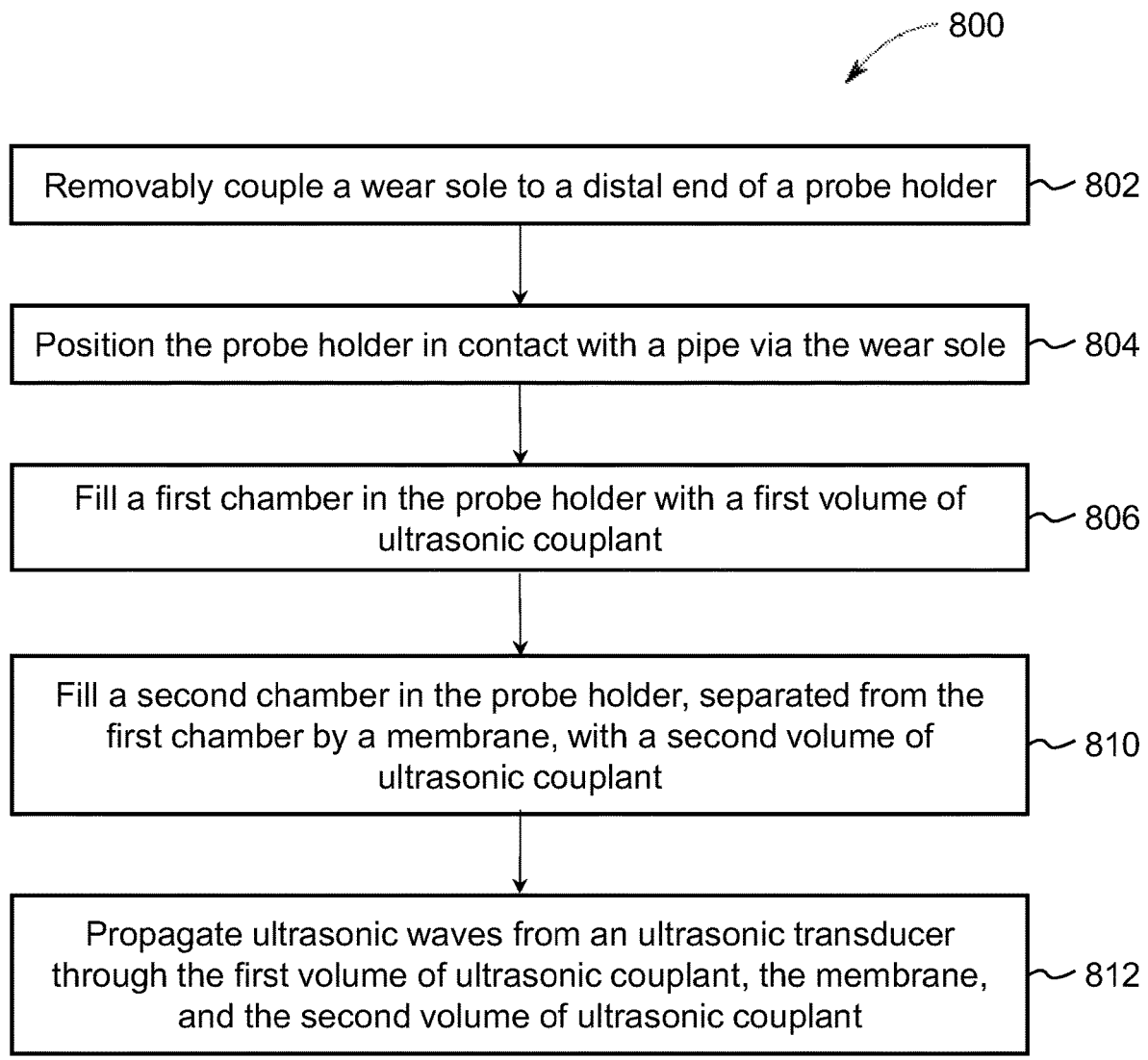
FIG. 8 is a flow diagram illustrating one exemplary embodiment of a method of ultrasonic inspection.

FIG. 8 is a flow diagram illustrating an exemplary embodiment of a method 800 for ultrasonic inspection. Embodiments of the method 800 are described below with reference to inspection apparatus 10. In certain aspects, embodiments of the method 800 can include greater or fewer operations than illustrated in FIG. 8 and can be performed in a different order than illustrated in FIG. 8.

In operation 802, a wear sole (e.g., 40, 40') can be removably coupled to a distal end (e.g., 20*d*) of a probe holder (e.g., 20).

In operation 804, the probe holder 20 can be positioned in contact with an outer surface of a target (e.g., pipe 62) via the wear sole 40, 40'. In alternative embodiments, the distal surface 42*d* of the wear sole 40 can be positioned adjacent to the outer surface of the target. As an example, the distal surface 42 of the wear sole 40 and the outer surface of the target can remain distanced from one another due to the pressure of ultrasonic couplant interposed therebetween.

In operation 806, a first chamber (e.g., 22) of the probe holder 20 can be filled with a first volume of an ultrasonic couplant.

In operation 810, a second chamber (e.g., 50) can be filled with a second volume of ultrasonic couplant. The second chamber 50 can extend between the wear sole 40, 40' and the pipe 62. As an example, the wear sole 40, 40' can include a membrane (e.g., 48) that separates the first chamber 22 from the second chamber 50 and the second chamber 50 can extend from the membrane 48 and the pipe 62. The second volume of ultrasonic couplant can also be in fluid contact with the pipe 62. In certain embodiments, the second volume of fluid couplant can be delivered to the second chamber 50 by a fluid channel (e.g., 60) extending through the probe holder 20 and the wear sole 40, 40'.

The first and second volumes of ultrasonic couplant can have a variety of configurations. In one aspect, the first volume of ultrasonic couplant in the first chamber 22 can be greater than the second volume of ultrasonic couplant in the second chamber 50. In another aspect, the first volume of ultrasonic couplant can be approximately constant, while the second volume of ultrasonic couplant can be continuously delivered to the second chamber 50 to fill the second chamber 50.

In operation 812, ultrasonic waves generated by an ultrasonic transducer (e.g., 30) can be propagated through the first volume of ultrasonic couplant, through the membrane 48, and through the second volume of ultrasonic couplant to the pipe. The membrane 48 can be configured to propagate ultrasonic waves emitted by the ultrasonic probe 30. That is, the membrane 48 can be substantially transparent to ultrasonic waves.

Optionally, the method can also include removing a first wear sole from the probe holder and replacing the first wear sole with a second wear sole. The first and second wear soles can be substantially the same, except for wear experienced by the first wear sole during use.

In further embodiments, a method 900 is provided for forming a wear sole (e.g., the wear sole 40) on a layer-by-layer basis (e.g., additive manufacturing). As shown in FIG. 9, the method includes operations 902 and 904. The operations of method 900 are further discussed with regards to FIGS. 1-7 and 10A-10C. In certain embodiments, the method 900 can provide one or more of reduction in manufacturing cost, increase of wear resistance, and weight reduction.

In operation 902, a plurality of layers are formed from at least one frame material. Adjacent layers of the plurality of layers can be bonded to one another to define the frame of the wear sole 40. The wear sole 40 formed in this manner can include the proximal surface 42p, the distal surface 42d, a frame body 42b extending between the proximal surface 42p and the distal surface 42d, the aperture 46, and one or both of the second fluid channel 52 and the third fluid channel 64.

As discussed above, the wear sole 40 can be coupled to the probe holder 20 and at least a portion of the distal surface 42d of the wear sole 40 can be placed into contact with the target (e.g., pipe 62). The second fluid channel 52 formed within the wear sole 40 can be configured such that the second volume of fluid couplant received by the second fluid channel 52 flows from the proximal surface 42p to the distal surface 42d. In certain embodiments, the second fluid channel 52 can be configured to cause the received second volume of fluid couplant to flow laminarly (e.g., non-turbulent flow) between the distal surface 42d and an outer surface of the target (e.g., pipe 62).

As an example, laminar flow can be created by the design of the wear sole 40. In one aspect, laminar flow between the distal surface 42d and an outer surface of the target can be achieved by avoiding formation of edges and corners within the second fluid channel 52. In another aspect, laminar flow between the distal surface 42d and an outer surface of the target can be achieved by keeping fluid flow in neighboring fluid passageways 52p at similar speeds (e.g., from about 1 m/s to about 3 m/s) prior to merging the fluid flow in the second chamber. In a further aspect, laminar flow between the distal surface 42d and an outer surface of the target can be achieved by elimination of boundaries within the second fluid channel that can create reverse flows (e.g., geometric discontinuities such as corners and spoilers and changes in cross-sectional area, In an additional aspect, laminar flow between the distal surface 42d and an outer surface of the target can be achieved by maintaining a trajectory of fluid flow at small deviations in angle (e.g., from about 0° to about 10°) with respect to a streamline direction of the main fluid stream. Laminar flow can also be created by iterative improvement with simulation, testing, and re-design.

Figure 10A:
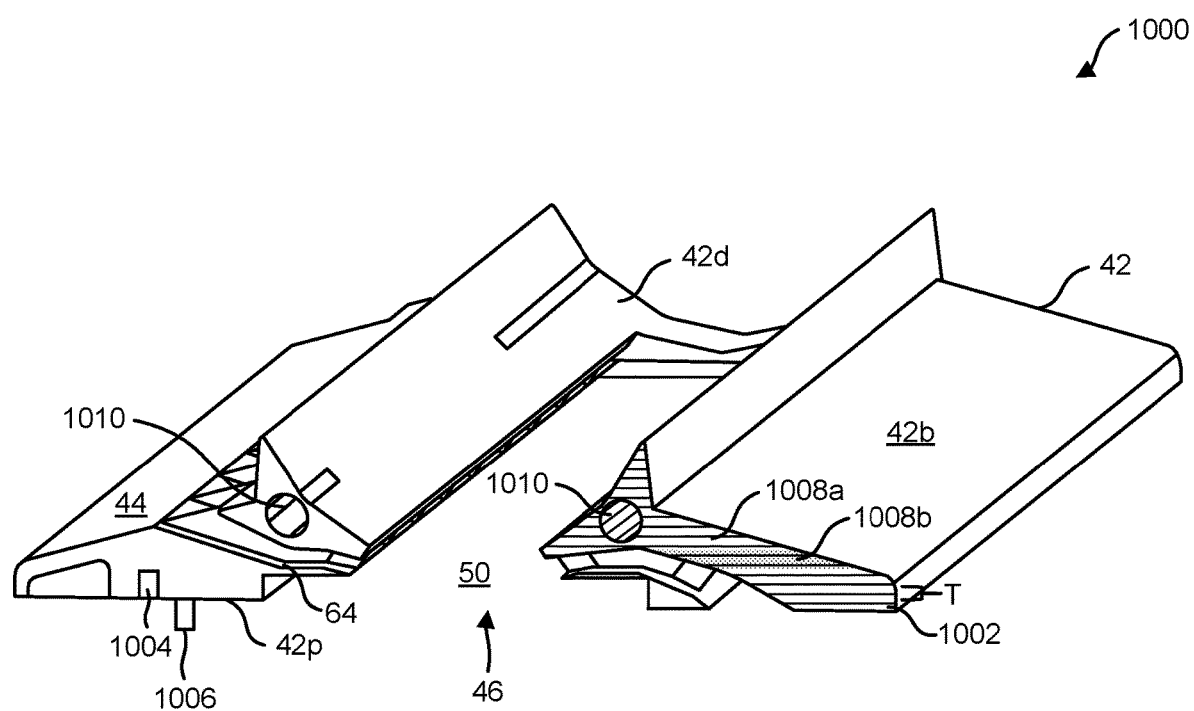
FIG. 10A is a perspective view illustrating one exemplary embodiment of a wear sole formed according to the method of FIG. 9 that includes cavities configured to receive wear resistant and/or reinforcing inlays, cavities for fluid guidance, and cavities configured for weight reduction.
Figure 10B:
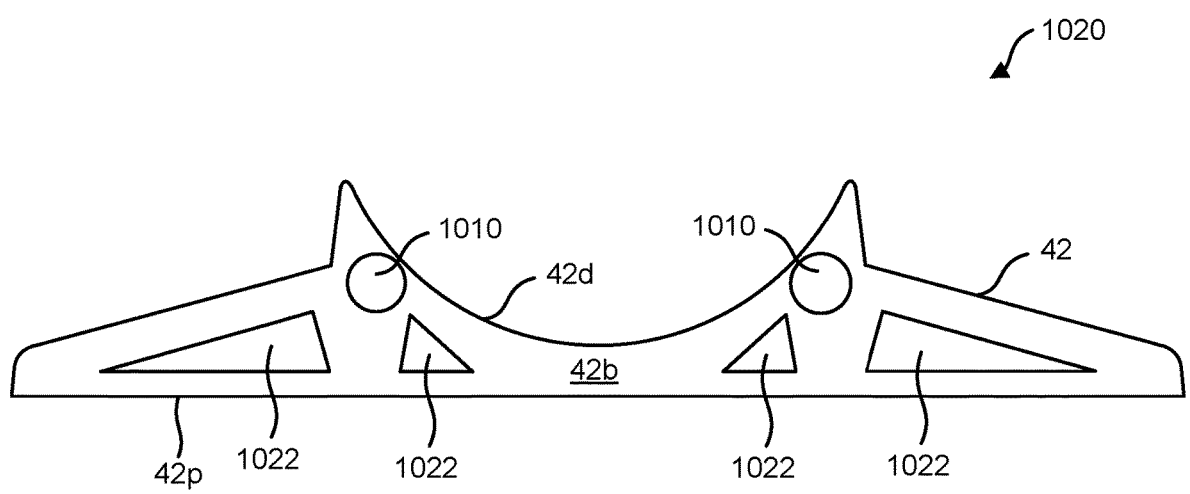
FIG. 10B is a side view illustrating another exemplary embodiment of a wear sole formed according to the method of FIG. 9 that includes cavities configured for reduced weight.
Figure 10C:
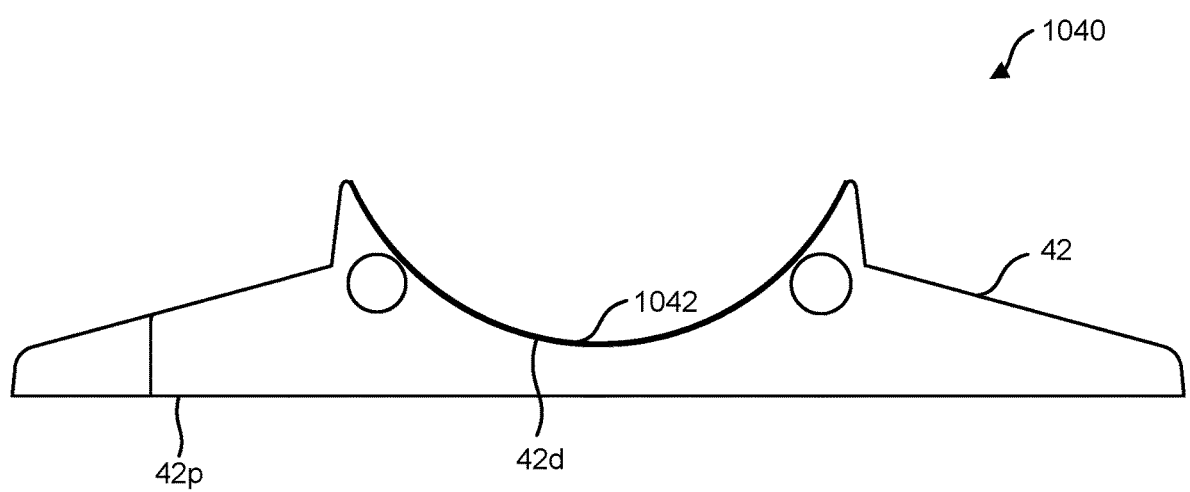
FIG. 10C is a side view illustrating a further exemplary embodiment of a wear sole formed according to the method of FIG. 9 that includes a wear resistive layer positioned on a distal surface.

Exemplary embodiments of the wear sole 40 formed in this manner are illustrated in FIGS. 10A-10C as wear soles 1000, 1020, 1040. As shown, in FIG. 10A, layers 1002 of predetermined shape are formed upon one another in least one direction (e.g., a thickness direction) to define the frame 42. For clarity, the layers 1002 are not shown in FIGS. 10B-10C. Each of the wear soles 1000, 1020, 1040 includes the frame 42, the proximal surface 42p, the distal surface 42d, a frame body 42b, the aperture 46, the second fluid channel 52, and the third fluid channel 64.

A thickness T of respective layers 1002 can be approximately the same or different from one another. In an embodiment, the thickness T of each of the layers 1002 can be independently selected from the range of about 0.001 mm to about 0.5 mm.

The proximal surface 42p can be configured to secure the frame 42 to the distal end 20d of the probe holder 20. That is, the plurality of layers can define one or more attachment features that are configured to secure the frame 42 to the distal end 20d of the probe holder 20. As an example, the wear soles 1000, 1020, 1040 can include the tab 44 and the tab 44 can be received within the slot 36 of the probe holder 20 by an interference fit to secure the wear sole 1000 to the probe holder 20. In alternative embodiments, the attachment features can be formed on or adjacent to the proximal surface 42p. As an example, the attachment features can include recesses 1004 extending proximally from the proximal surface 42p (e.g., into the frame body 42b) and/or protrusions 1006 extending distally from the proximal surface 42p. The probe holder 20 can include mating features configured to engage such recesses and/or protrusions.

In an embodiment, the plurality of layers can be formed by one or more additive manufacturing techniques. Examples of additive manufacturing can include VAT photopolymerization, material jetting, binder jetting, material extrusion, powder bed fusion, sheet lamination, and directed energy deposition, alone or in any combination. Examples of the frame material can include, thermoplastics (e.g., polyamide [PA], acrylonitrile butadiene styrene [ABS], polylactic acid [PLA]), photopolymers (e.g., SU-8), and steels (e.g., stainless, copper, aluminum). The printed matrix can include any filling material that can increase strength, such as carbon fiber, glass fiber, Kevlar® (DuPont, Wilmington, Del., USA), etc.

In VAT photopolymerization, a substrate is lowered into a vat of liquid photopolymer resin by the layer thickness T. The resin is the frame material and, when exposed to ultraviolet (UV) light, is cured to form a first layer in a predetermined shape. Subsequently, the substrate is again lowered into the resin by layer thickness T and the ultraviolet (UV) light cures the resin to form a second layer in a predetermined shape which is positioned on top of, and bonded to, the first layer. This process of lowering the substrate into the frame material resin and curing the resin is repeated to form as many layers as is necessary to complete the frame 42.

In material jetting, a print head is positioned above a substrate. Droplets of the frame material are deposited from the print head in a predetermined shape onto the substrate. Following deposition, the droplets of the frame material solidify to form the first layer. Droplets of the frame material are subsequently deposited from the print head in a predetermined shape onto the first layer. Following deposition, the droplets of the frame material solidify to form the second layer in a predetermined shape which is positioned on top of, and bonded to, the first layer. This process of depositing and solidifying the frame material is repeated to form as many layers as is necessary to complete the frame 42.

In binder jetting, a powder of the frame material is spread over a substrate (e.g., using a roller). A print head then deposits a binder adhesive upon the powder in a predetermined shape to form the first layer. The substrate is then lowered by the layer thickness T and the process is repeated to form the second layer in a predetermined shape upon the first layer. This process of depositing the frame material powder and binder adhesive is repeated to form as many layers as is necessary to complete the frame 42. Examples of the binder can include, but are not limited to polymer adhesives.

In material extrusion, a first layer of the frame material is heated and deposited on a substrate by extrusion from an extrusion head (e.g., a nozzle) in a predetermined shape. A second layer of the frame material is similarly heated and deposited in a predetermined shape upon the first layer. Adjacent layers can be fused together upon deposition, as the extruded frame material is in a flowable state having a predetermined viscosity. (e.g., at least partially melted). This process of heating and extruding the frame material is repeated to form as many layers as is necessary to complete the frame 42. This process is repeated until the frame 42 is completely formed.

In powder bed fusion, a powder of the frame material is deposited on a substrate. A laser fuses the deposited frame material powder in a predetermined shape to form the first layer. A new layer of frame material powder is deposited upon the first layer and a laser fuses the deposited frame material powder in a predetermined shape to form the second layer. Adjacent layers can be bonded together upon fusion. This process of depositing and fusing the powder frame material is repeated to form as many layers as is necessary to complete the frame 42. Specific embodiments of powder bed fusion can include direct metal laser sintering (DMLS), electron beam melting (EBM), selective heat sintering (SHS), selective laser melting (SLM), and selective laser sintering (SLS).

In sheet lamination, sheets of the frame material are stacked and bonded to one another. The sheets can be cut to respective predetermined shapes and then bonded together or bonded together and then cut to a predetermined shape. Specific embodiments of sheet lamination can include ultrasonic additive manufacturing (UAM) and laminated object manufacturing (LOM).

In directed energy deposition, a multi-axis arm (e.g., 4-axis, 5-axis, etc.) equipped with a nozzle moves around an object that is fixed in place. The frame material is deposited from the nozzle (e.g., in a wire or powder form) onto existing surfaces of the object. Following deposition, the frame material can be melted using a laser, electron beam, or plasma arc and subsequently solidified in a predetermined shape to form the first layer. A new layer of frame material is deposited upon the first layer and is melted and solidified in a predetermined shape to form the second layer. Further layers are built up in like fashion, with cooling of each fused layer resulting bonding to the layer which underlies it. This process is repeated until the frame 42 is completely formed. Additive manufacturing can enable formation of wear soles exhibiting new features and designs. Examples of features that can be formed are illustrated in FIGS. 10A-10C.

In one embodiment, the plurality of layers can define a first region 1008a including a first frame material exhibiting a first acoustic property and a second region 1008b including a second frame material exhibiting a second acoustic property. The first and second regions 1008a, 1008b can occupy different locations within the frame and the first and second frame materials can be different materials.

Examples of the first and second frame materials can be independently selected from elastomers, polymers having a predetermined strength (e.g., tensile, compression, and/or bending strength from the range of about 10 MPa to about 80 MPa), steels, metal alloys, non-hardened steels, non-hardened metal alloys, non-cured (e.g., non-cross-linked) polymers.

The relative fractions of the first and second regions 1008a, 1008b, and their relative placement within the frame body 42b, can be configured to tailor one or more acoustic properties of the frame 42. Configurations of the first and second regions 1008a, 1008b can include one or more entire layers of the plurality of layers and portions thereof. The first and second regions 1008a, 1008b can be arranged in a continuous or discontinuous manner according to a predetermined pattern. Examples of arrangements of the first and second regions 1008a, 1008b can include patterns to create acoustic properties such as parallel structures or checked patterns. In certain embodiments, the first and second regions 1008a, 1008b can be configured to achieve acoustic attenuation within a range of normalized viscosities from about 2 MPa*s/m to about 10 MPa*s/m (e.g., by adjustment of their respective volume fractions). In further embodiments, acoustic impedance of the wear sole can vary from about 2.2 MRayl to about 3 MRayl (mega Rayleigh units of acoustic impedance).

In other embodiments, attenuation within a material can optionally be a function of a build direction. That is, a direction in which the layer containing the material is oriented with respect to the geometry of the wear sole 40. As an example, specific attenuation of a first frame material within the first region 1008a can vary from about 10 dB/cm to about 15 dB/cm and specific attenuation of a second frame material within the second region 1008b can vary from about 45 dB to about 55 dB, depending upon whether the build direction is to the side, bottom, or back of the wear sole 40. Advantageously, a 3D printing device forming the wear sole 40 can be configured to vary the build directions of different portions of the wear sole 40 to provide desired acoustic properties. It can be understood, however, that in alternative embodiments, acoustic properties of a given layer and/or the wear sole as a whole can be configured to vary in any direction of interest, regardless of whether or not that direction is the build direction.

As an example, the first region can include a layer formed from a fully bonded polymer material and the second region can include unbonded polymer powder. The first and second regions can be arranged in alternating fashion, with the first region of fully bonded polymer constraining the unbonded polymer powder of the second region. Such layers can be arranged in parallel layers, each having a thickness of about 1 mm. In this manner, the frame 42 can exhibit the acoustic property of almost full attenuation within a range of normalized viscosity from about 5 MPa*s/m to about 10 MPa*s/m.

In further embodiments, as shown in FIGS. 10A-10B, The plurality of layers can define at least one cavity within the frame body 42*b*.

In one aspect, at least one first cavity 1010 can be configured to receive a reinforcement material, different from the frame material (e.g., the first and/or second frame materials). In one embodiment, the reinforcement material can exhibit a greater strength (e.g., compressive strength, tensile strength, and/or bending strength) than the frame material. In this manner, strength of the frame 42 can be increased. As an example, the reinforcement material can exhibit a strength within the range from 100 MPa to about 4000 MPa. Examples of the reinforcement material can include carbon fiber, glass fiber, steel alloys, ceramic inlays, Kevlar® inlays, etc.

In another embodiment, the reinforcement material can exhibit a greater stiffness (e.g., elastic modulus) than the frame material. As an example, the reinforcement material can exhibit an elastic modulus within the range from 100 GPa to about 4000 MPa. Examples of reinforcement materials can include carbon fiber, glass fiber, steel alloys, ceramic inlays, Kevlar® inlays, etc. In this manner, a stiffness of the frame 42 can be increased.

In another aspect, the at least one first cavity 1010 can be dimensioned to receive a hardened material exhibiting specific wear properties. The hardened material can exhibit a greater wear resistance (e.g., hardness) than the frame material. In this manner, wear resistance and operating life of the wear sole can be increased. As an example, the hardened material can exhibit a hardness within the range from about 100 MPa to about 450 MPa. The hardened material can include one or more of hardened metals, ceramics, reinforced plastics, and combinations thereof. Further examples of hardened material can include ceramics (e.g., aluminum oxide), metals case hardened by nitriding, etc.

Embodiments of the method 900 can incorporate the reinforcement material into the frame body 42*b* in a variety of ways. In one aspect, the at least one first cavity 1010 can be formed as void space that is subsequently filled with the reinforcement material. In another aspect, the reinforcement material can be formed in-situ within the at least one first cavity 1010. That is, concurrently with the layers 1002.

Embodiments of the shape and placement of the at least one first cavity 1010 within the frame body 42*b* can be varied. In one aspect, the shape of the at least one first cavity 1010 can be round, elliptical, or polygonal. As shown in FIG. 10A, the at least one first cavity 1010 can possess a generally tubular shape (e.g., having a generally circular cross-section) extending along at least a portion of the length of the frame 42. The at least one first cavity 1010 can be positioned at close to the distal surface 42*d* (e.g., at a distance of about 0.1 mm to about 3 mm from the distal surface 42) within the frame body 42*b*.

The at least one first cavity 1010 can occupy a predetermined fraction of the wear sole 1000, 1020. As an example, the at least one first cavity 1010 can occupy a fraction of the wear sole 1000, 1020 selected from the range of about 1 vol. % to about 10 vol. % on the basis of the total volume of the frame body 42*b*.

In another aspect, as illustrated in FIGS. 10A-10B, the plurality of layers can define at least one second cavity 1022 within the frame body 42*b*. The at least one second cavity 1022 can be an unfilled void space configured to reduce a weight of the frame 42 as compared to a comparable frame formed without the at least one second cavity 1022. In this manner, a weight of the wear sole 1000, 1020 can be reduced.

Embodiments of the shape and placement of the at least one second cavity 1022 within the frame body 42*b* can be varied. In one aspect, the shape of the at least one second cavity 1022 can be round, elliptical, or polygonal. As shown in FIG. 10B, the at least one second cavity 1022 can possess a generally tubular shape that extends along at least a portion of the length of the frame 42 (e.g., into the page) and possesses a generally triangular cross-section. The at least one second cavity 1022 can be positioned at any area within the frame body 42*b*.

The at least one second cavity 1022 can occupy a predetermined fraction of the wear sole 1000, 1020. As an example, at least one second cavity 1022 can occupy a fraction of the wear sole 1000, 1020 that is selected from the range of about 1 vol. % to about 50 vol. % on the basis of the total volume of the frame body 42*b*.

In another embodiment, illustrated in FIG. 10C, a hardened material 1042, different from the frame material, can be positioned on at least a portion of the distal surface 42*d*. As discussed above, the distal surface 42*d* can be configured to contact the target. As shown in FIG. 10C, the distal surface 42*d* can be curved and dimensioned to abut at least a portion of an outer surface of a curved target, such as a pipe. In other embodiments, the shape of the distal surface can be configured to mate with outer surfaces of targets having different shapes (e.g., flat, non-circular, etc.).

The hardened material 1042 can exhibit specific wear properties, such as greater wear resistance (e.g., hardness) than the frame material. As an example, the hardened material 1042 can exhibit a hardness within the range from about 160 GPa to about 450 GPa. The hardened material 1042 can include one or more of hardened metals, ceramics, reinforced plastics, and combinations thereof. Further examples of the hardened material 1042 can include carbon fiber, glass fiber, steel alloys, ceramics (e.g., aluminum oxide), metals case hardened by nitriding, etc. Non-hardened materials such as brass alloys can also be employed to improve wear properties. In this manner, wear resistance and operating life of the wear sole can be increased.

Embodiments of the method 900 can position the hardened material 1042 on the distal surface 42*d* in a variety of ways. In one aspect, after the frame 42 is formed from the plurality of layers, the hardened material 1042 can be positioned on at least a portion of the distal surface 42*d*. In another aspect, the hardened material 1042 can be formed in situ. That is, concurrently with the layers 1002 of the plurality of layers.

As shown in FIG. 10A, the aperture 46 extends through the proximal surface 42*p*, the frame body 42*b*, and the distal surface 42*d*. In operation 904 of the method 900, the membrane 48 can placed within the aperture 46. The membrane 48 can be coupled to the frame 42 by a substantially fluid-tight seal that inhibits passage of a fluid from the proximal surface 42*p* through the aperture 46.

So configured, the second fluid channel 52 can extend from the proximal surface 42*p* to the chamber 50 extending laterally between the side walls of the aperture 46, extending proximally by a distal surface of the membrane, and distally by the intersection of the aperture 46 and the distal surface 42*d* of the frame 42.

The membrane 48 can be placed within the aperture 46 in a variety of ways. In one aspect, after the frame 42 is formed from the plurality of layers, the membrane 48 can be positioned within the aperture 46. An adhesive or other sealing mechanism can be employed to form the substantially fluid-tight seal. In another aspect, the membrane 48 can be formed in-situ. That is, concurrently with the layers 1002.

It can be understood that embodiments of the disclosure can be employed for manufacture of wear soles having configurations different than the wear sole 40. In one aspect, the first and second fluid channels 26, 52 can be omitted and couplant can be directed to the second chamber 50 by one or more alternative mechanisms. As an example, a pressurized flow of couplant can be directed to the second chamber 50 from outside of the wear sole.

Exemplary technical effects of the methods, systems, and devices described herein include, by way of non-limiting example, the ability to direct ultrasonic couplants from a probe holder through a wear sole of an ultrasonic inspection apparatus, a reduction in inspection delays arising from replacement of drained ultrasonic couplants, and rapid replacement of the wear sole. Through the use of additive manufacturing techniques, wear soles can be formed at lower cost and with improved properties (e.g., wear resistance, weight reduction, etc.)

Certain exemplary embodiments have been described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method, comprising:
   forming a plurality of layers from at least one frame material, wherein adjacent ones of the plurality of layers are bonded to one another to define a frame of a wear sole including:
   a proximal surface configured to secure the frame to a distal end of a probe holder,
   a distal surface configured to contact a portion of a target surface;
   a frame body extending between the proximal and distal surfaces;
   an aperture extending through the proximal surface, the body, and the distal surface; and
   a channel extending from the proximal surface to a chamber in fluid communication with the distal surface;
   wherein the plurality of layers define a first region including a first frame material exhibiting a first acoustic property and a second region including a second frame material exhibiting a second acoustic property, wherein the first and second regions occupy different locations within the frame.

2. The method of claim 1, further comprising placing a membrane within the aperture, adjacent to the proximal surface, wherein the membrane is coupled to the frame body by a substantially fluid-tight seal so as to inhibit passage of a fluid through the proximal surface via the aperture.

3. The method of claim 1, wherein the chamber extends within the frame body between a distal surface of the membrane and the distal surface of the frame.

4. The method of claim 1, wherein the first and second frame materials are different materials.

5. The method of claim 1, wherein plurality of layers define at least one cavity within the frame body.

6. The method of claim 5, wherein the plurality of layers define at least one first cavity configured to receive a reinforcement material having a strength greater than a strength of the at least one frame material.

7. The method of claim 5, wherein the plurality of layers define at least one first cavity configured to receive a reinforcement material having a stiffness greater than a stiffness of the at least one frame material.

8. The method of claim 5, wherein the plurality of layers define at least one first cavity configured to receive a hardened material having a hardness greater than a hardness of the at least one frame material.

9. The method of claim 5, wherein the plurality of layers define at least one second cavity configured to reduce a weight of the frame as compared to a comparable frame formed without the at least one second cavity.

10. The method of claim 1, wherein the plurality of layers define one or more attachment features formed on or adjacent to the proximal surface and configured to secure the frame to the distal end of a probe holder.

11. The method of claim 1, wherein the distal surface is curved and dimensioned to abut a curved portion of an outer surface of a target.

12. The method of claim 1, further comprising placement of a wear resistant layer on at least a portion of the distal surface.

13. The method of claim 1, wherein the channel is configured to cause a fluid received from a probe holder to flow laminarly from the proximal surface to the distal surface.

14. The method of claim 11, wherein the target is one of a pipe, a bar, a billet, or a rail wheel.

15. The method of claim 11, wherein the target is formed from a composite material.

* * * * *